UNITED STATES PATENT OFFICE.

NOAH WRINKLE AND ROBERT G. PADDOCK, OF SAN FRANCISCO, CALIFORNIA.

METHOD OF OBTAINING CARBONATE OF SODA.

1,016,239.   Specification of Letters Patent.   Patented Jan. 30, 1912.

No Drawing.   Application filed November 16, 1911. Serial No. 690,693.

*To all whom it may concern:*

Be it known that we, NOAH WRINKLE and ROBERT G. PADDOCK, citizens of the United States, residing in the city and county of San Francisco and State of California, have invented new and useful Improvements in Methods of Obtaining Carbonate of Soda, of which the following is a specification.

Our invention relates to methods for obtaining sodium carbonate, which is commonly known as soda ash, and has for its object to provide a process for obtaining sodium carbonate for commercial purposes, from waters of certain lakes, which abound in California and elsewhere. The waters of these lakes contain sodium carbonate, sodium bicarbonate, sodium chlorid, sodium sulfate and other soluble mineral salts. They also contain suspended and dissolved organic matter.

We have discovered a process whereby we are able to extract from the waters the sodium carbonate component freed from the sodium chlorid, sodium sulfate and other soluble minerals, and the organic matter. The ordinary method of obtaining sodium carbonate from said waters is practiced by causing the combination of a portion of the normal and acid carbonate by evaporation and concentration, and the deposition of urao. The urao is removed from the mother liquor, which still retains the sodium chlorid, sulfate and other impurities, together with the excess of sodium carbonate, and subjected to a treatment which separates the urao into normal carbonate of soda and carbon dioxid.

Our method consists in a novel series of steps. Its purpose is to recover the normal carbonate alone, freed from the sodium chlorid and sulfate of soda and other impurities present in the lake waters.

While our process is intended to obtain pure sodium carbonate from the natural waters containing other contaminating salts, the separation of the sodium carbonate component is dependent upon the presence of these salts, and by virtue of the presence of these contaminating salts we cause the soluble sodium carbonate component to assume an insoluble form by treatment with carbon dioxid. This treatment causes the sodium carbonate component of the waters to precipitate as sodium bicarbonate, and it is then removed from the mother liquor, which retains in solution the sodium chlorid and sulfate of soda, and other soluble salts; and thereafter we convert this $HNaCO_3$ into $Na_2CO_3$.

To secure the desired economy and greatest efficiency from our process, we have found that it is desirable to use lake waters containing in solution sodium carbonate, sodium sulfate, sodium bicarbonate and sodium chlorid, the sodium chlorid being less in amount than the other aforesaid constituents combined, and that the solution should have a specific gravity between 1.14 and 1.30 at 60° Fahrenheit. We obtain a solution of this gravity by the evaporation of the waters of the lakes by solar heat when necessary.

Having the lake water at the proper specific gravity, and containing in solution sodium chlorid, sodium carbonate, sodium sulfate, sodium bicarbonate and other soluble matter, the sodium sulfate, sodium carbonate and sodium bicarbonate being greater in combined quantity than the sodium chlorid and other soluble matter, we subject the water to the action of carbon dioxid, under pressure, in suitable absorption apparatus, for the purpose of removing the sodium carbonate component by virtue of the insolubility in the mother liquor of the $HNaCO_3$, formed by the combination of the sodium carbonate component and the carbon dioxid added to the water undergoing treatment. The $HNaCO_3$ thus formed precipitates and is removed from the water. It contains more or less organic coloring matter. To remove this organic coloring matter and to reduce the precipitate to dense soda ash of marketable quality, we subject the precipitate to the action of heat in a suitable furnace fired with oil, or gas, which causes the precipitate to be melted and converted to soda ash. The soda ash flows from the furnace and is then cooled, ground and prepared for market.

The cost of production is greatly decreased by the next step in our process, which consists in conserving the carbon dioxid liberated from the sodium bicarbonate undergoing transformation in the furnace to soda ash, and the carbon dioxid generated by the combustion of the fuel used to heat the furnace, and using the carbon dioxid thus obtained in treating the lake waters as heretofore described. We find that the quantity of carbon dioxid obtained in this manner is more than sufficient to practice the process continuously.

It is to be noted that the water undergoing treatment by $CO_2$ in the above described process need not be confined to any particular temperature; but may have a temperature anywhere between 60° and 140° Fahrenheit.

In applying our process to the natural deposits left on the lake shores, or bottoms, by the spontaneous evaporation of the lake waters, we add water from extraneous sources to dissolve the deposit, then concentrate the solution by solar heat to the proper density, and thereafter proceed in the same manner as with the lake waters.

We claim:

1. A process for obtaining the carbonate of soda from a solution containing sodium carbonate, sodium chlorid, sodium sulfate, sodium bicarbonate and other soluble matter, the sodium carbonate, sodium bicarbonate and sodium sulfate being greater in combined quantity than the sodium chlorid and other soluble matter, which consists in first reducing by solar heat the solution to a specific gravity between 1.14 and 1.30 at 60° Fahrenheit, treating the solution at that density with carbon dioxid to convert the soluble carbonate of soda to sodium bicarbonate insoluble at said density, separating the resulting precipitate from the mother liquor, and melting the precipitate to drive off the carbon dioxid, carbonating a further quantity of the concentrated solution with the mixture of the products of combustion of the fuel and the carbon dioxid given off by the bicarbonate.

2. A process for obtaining the carbonate of soda from a solution containing sodium carbonate, sodium chlorid, sodium sulfate, sodium bicarbonate and other soluble matter, the sodium carbonate, sodium bicarbonate and sodium sulfate being greater in combined quantity than the sodium chlorid and other soluble matter, which consists in first reducing by solar heat the solution to a specific gravity between 1.14 and 1.30 at 60° Fahrenheit, treating the solution at that density with carbon dioxid to convert the soluble carbonate of soda to sodium bicarbonate insoluble at said density, separating the resulting precipitate from the mother liquor, melting the precipitate to drive off the carbon dioxid, and applying the carbon dioxid driven off by melting to the carbonating of more of the solution.

3. A process for obtaining the carbonate of soda from a solution containing sodium carbonate, sodium chlorid, sodium sulfate, sodium bicarbonate and other soluble salts and organic matter, the sodium carbonate, sodium bicarbonate and sodium sulfate being greater in combined quantity than the sodium chlorid and other soluble matter, which consists in treating the solution at a specific gravity between 1.14 and 1.30 at 60° Fahrenheit, with carbon dioxid to convert the soluble carbonate of soda to sodium bicarbonate insoluble in said solution, separating the resulting precipitate from the mother liquor, subjecting the precipitate to the direct application of the heat and products of combustion in a suitable furnace to effect the oxidation and eliminating of the contaminating organic matter, and converting the sodium bicarbonate to sodium monocarbonate free from objectionable organic matter.

4. A process for obtaining the carbonate of soda from a solution containing sodium carbonate, sodium chlorid, sodium sulfate, sodium bicarbonate and other soluble salts and organic matter, the sodium carbonate, sodium bicarbonate and sodium sulfate being greater in combined quantity than the sodium chlorid and other soluble matter, which consists in treating the solution at a specific gravity between 1.14 and 1.30 at 60° Fahrenheit, with carbon dioxid to convert the soluble carbonate of soda to sodium bicarbonate insoluble at said density, separating the resulting precipitate from the mother liquor, subjecting the precipitate to the direct application of the heat and products of combustion of a gas or oil flame in a suitable furnace, and carbonating a further quantity of the solution with the mixture of the gaseous products of combustion of the fuel and the carbon dioxid given off by the bicarbonate from the furnace.

In testimony whereof, we have hereunto signed our names, as such inventors, in presence of two witnesses, in the city and county of San Francisco, State of California, this 30" day of October, 1911.

NOAH WRINKLE.
ROBERT G. PADDOCK.

In the presence of—
P. J. O'Dea,
Harold Faulkier.